Figure 6:
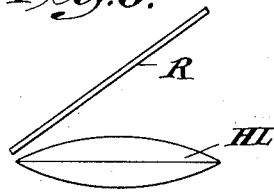

Dec. 1, 1936.  D. HINE  2,062,512
MOTOR VEHICLE VISION PRESERVER
Filed Jan. 25, 1930  3 Sheets-Sheet 1
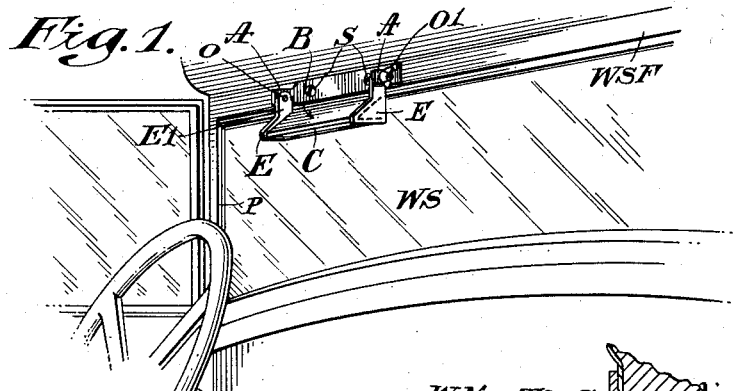
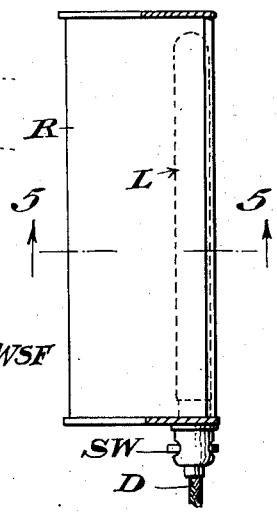
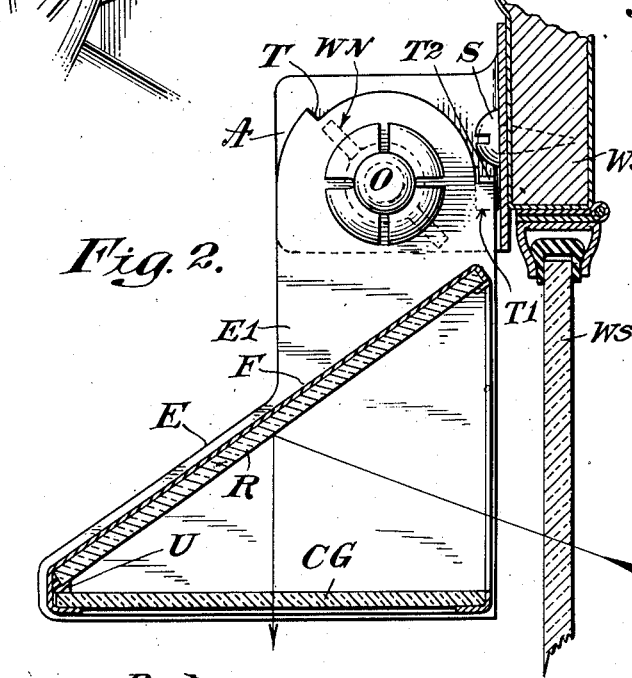
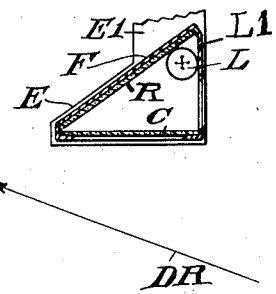
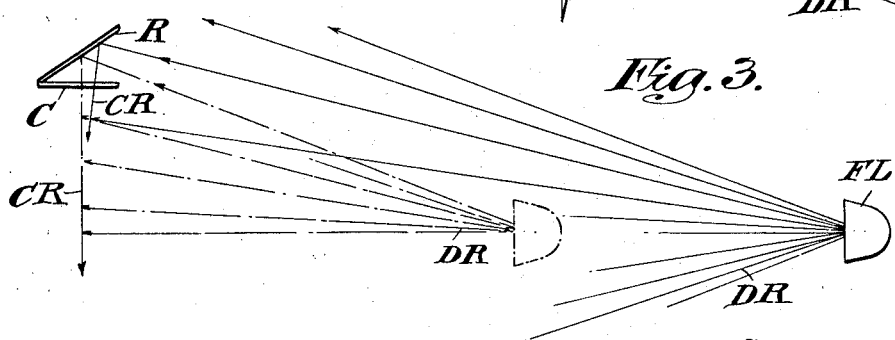
Inventor:
Dewey Hine
By his Attorney
Philip Farnsworth Dec. 1, 1936.    D. HINE    2,062,512
MOTOR VEHICLE VISION PRESERVER
Filed Jan. 25, 1930    3 Sheets-Sheet 2

Inventor:
Dewey Hine
By his Attorney
Philip Farnsworth

Dec. 1, 1936.         D. HINE         2,062,512
MOTOR VEHICLE VISION PRESERVER
Filed Jan. 25, 1930         3 Sheets-Sheet 3
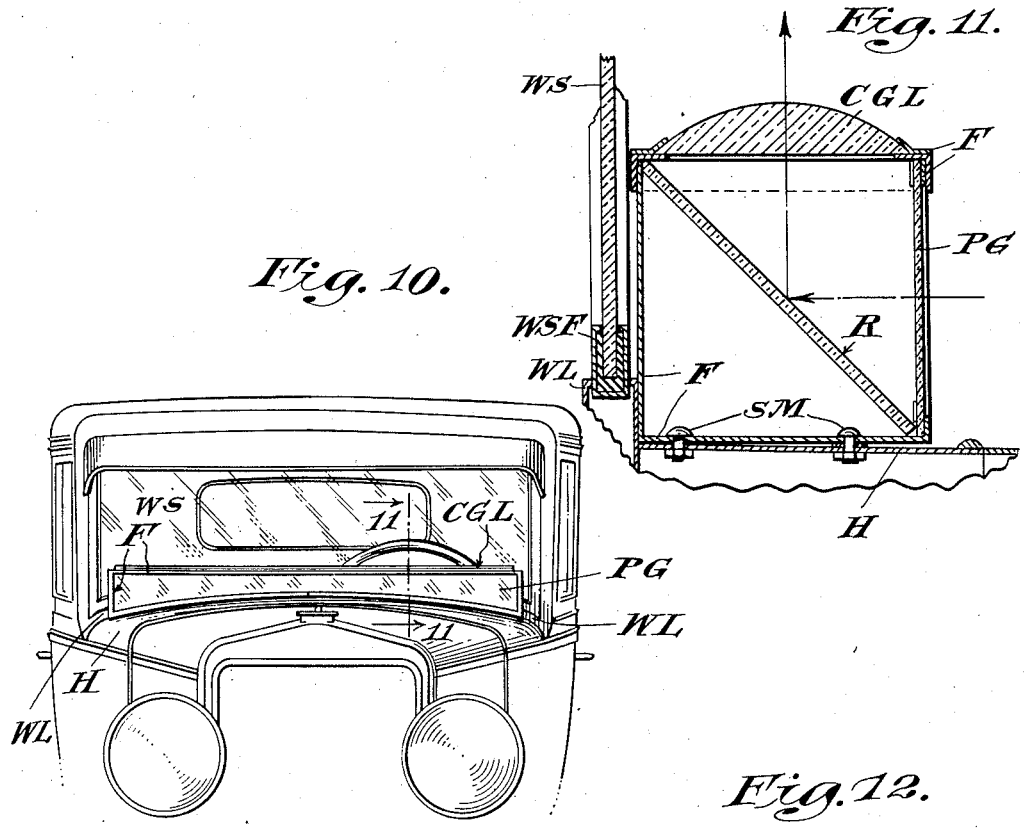
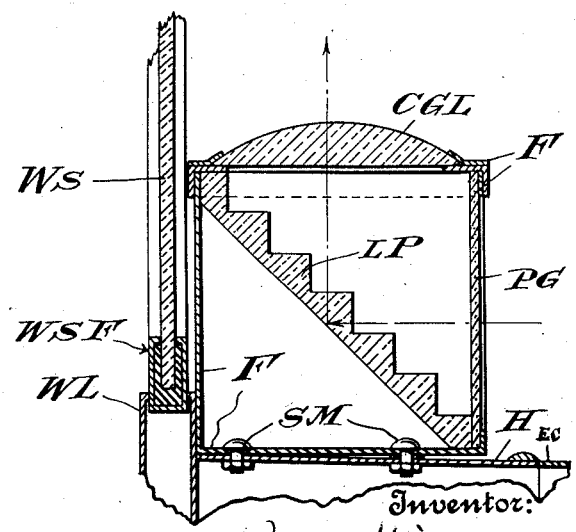

Patented Dec. 1, 1936

2,062,512

UNITED STATES PATENT OFFICE 2,062,512

MOTOR VEHICLE VISION-PRESERVER

Dewey Hine, Boonton, N. J., assignor of one-half to Philip Farnsworth, Summit, N. J.

Application January 25, 1930, Serial No. 423,293

28 Claims. (Cl. 296—97)

This invention relates to the night-time preservation of clear vision of the road ahead by motor-vehicle drivers and passengers and of that particular portion of the road ahead which lies to the right of bright lights facing the vehicle including such lights as bright head-lamps carried by an approaching vehicle facing the vehicle equipped with and protected by the present invention.

As is well known, at a certain comparatively short distance apart of approaching cars (even if both of them exhibit bright head-lights facing one another) there is an illusion of darkness ahead to the right which is apparent to the driver and passengers of a car toward which the other car with bright head-lamps is approaching, such condition of apparent darkness existing notwithstanding the brightness of the lamps on the car carrying such driver or passengers. The driver's own bright head-lights may be directed at such place of apparent darkness, but yet either he can not see at all the road in front of him at such "dark spot" or else his vision thereof is very much reduced and not desirably clear so that in either case his vision of pedestrians or other road obstacles comparatively near to and in front of him is impaired to a more or less dangerous degree for an appreciable interval of time during which his car may travel far enough to strike the pedestrians or road obstacles or obstruction even if he slows down as soon as the "dark spot" becomes apparent to him. That is so common a phenomenon that now-a-days road-signs sometimes direct pedestrians to proceed along the roadway on the left side thereof, i. e. in the path of cars approaching them from in front instead of in rear. But even if there be no pedestrians at such "dark spot" there are likely to be road obstacles or curves, etc. ahead constituting dangerous conditions for a car continuing to move forward at any ordinary rate.

An object of the invention is the preservation of vision of the road ahead under the above conditions and by means of the illumination of said road by the vehicle's own head-lights such preservation of vision being to the extent that said dark spot either is eliminated entirely or else the road-visibility at such location is increased by use of the invention so that the road-vision by the driver and/or passengers is preserved to a substantial extent and is not impaired to a dangerous extent upon the approach of the vehicle to bright lights ahead and slightly to the left.

Various solutions of this problem has been proposed including those involving the temporary interposition of a small transparent sheet of colored glass or the like color-screen directly in the line of vision between the eyes of the driver and the approaching offending bright head-lamps so that the rays from the latter incident upon such colored transparent sheet are prevented from reaching the driver's eyes save for those which pass through the colored sheet to the driver's eyes; such colored rays however proceeding directly to the driver's eyes in the line of his road-vision. While such colored transparent eye-shield or sheet possesses some degree of useful effect in preserving vision of the road ahead and alongside of approaching cars with bright head-lamps yet the presence of such a shield in front of the driver's eyes and in his line of vision of the road ahead is attended with such inconvenience (such as actually reducing road vision in the absence of bright lights ahead unless such shield is removed by the driver from his line of vision) that drivers prefer to limit their use of such shield to times only when their cars are approaching bright lights ahead with the result that it is necessary for the driver to move the colored sheet out of his line of road-vision.

Pursuant to the present invention in its simplest form to be described there is no interposition of any object (save the usual transparent windshield) in the line of road-vision of the driver or other persons in the car; and instead of causing or permitting rays initiating from the bright offending lights ahead (from any source whether movable or stationary) to pass directly to a color-screen located in the line of road-vision by persons in the vehicle, in this invention some of the rays from the offending lights which pass at angles to the path of normal forward vision from the vehicle, are received at a locality on the vehicle outside said path, and then are reflected, as colored light, into the path of vision of such offending lights, from said locality of reception and reflection outside said path, with the desired useful effect of preserving vision of the road ahead of the driver's car by means of the illumination by the driver's own head-lamps, without interposition of any color-screen in the path of normal forward vision from the vehicle. The effect of such colored light is to reduce the straining effect of the offending lights ahead upon the eyes of the person in the vehicle behind such colored light in observing the road ahead. That is, in this invention the rays from the bright offending lights ahead (such as those of a car facing the driver in question who is aided by the invention) are received by a vision-preserver located out of the driver's line of road-vision and from said vision-preserver the light so received from the offending lights ahead is directed in the form of colored light into the driver's line of road-vision with the above useful effect but without interposition of any object in said line of vision save any desired transparent wind-shield. Thus in the invention a portion of the light received from offending lamps ahead is utilized as a means for reducing the straining effect on the driver's eyes of those very lamps which otherwise would cause the stress. And the more intense is the offending light from the facing lamps ahead, the greater will be the intensity of the colored light which therefore automatically discounts the stressing effect on the driver's eyes. Thus, as the distance is reduced between the driver's car and the lamps ahead, the effect of the colored light of my vision-preserver which results from such lamps is increased, so that as the distressing tendency increases, its effect is counteracted automatically by the invention, and without the employment of any vision-reducing glare-shield in the path of the driver's forward vision. That is, the driver's effort in general vision of the road ahead, including the portion alongside an approaching car, is not increased so greatly as heretofore, by the effect on his eyes of the lights ahead of and facing him.

The result is that normally there is nothing but the transparent windshield in the line of vision from the protected car to the road ahead illuminated by its own head-lamps, not even said colored cross-rays of the present invention; but whenever bright lights appear ahead then without any act of the driver the light from such bright lights causes the passage of colored rays into, as across, the path of the driver's road-vision ahead (such as that portion of the road alongside an approaching car carrying bright head-lamps) such colored reflected-rays thereby preserving vision of the road ahead to a useful extent which correspondingly reduces danger of striking pedestrians or road obstacles, and as soon as said bright lights disappear from the line of road-vision then the colored rays caused by the presence of such lights themselves at once disappear and the driver resumes normal vision of the road ahead by his own head-lamps and without any motion of his own in removing any object from his line of road-vision.

Of the drawings which show various forms of the invention,

Fig. 1 is a perspective of the interior of a motor-vehicle showing one of the vision-preservers of the invention in one of its various permissive locations out of the path of normal forward vision by the eyes of persons in the vehicle, the vision-preserver in this instance being located at about the top of the wind-shield, i. e. being secured to the top frame thereof and as high up as the construction of the interior of the car will permit and well above the path of forward-vision over the engine-hood of the vehicle;

Fig. 2 is a vertical longitudinal section of the vision-preserver and the wind-shield of Fig. 1 showing in greater detail the means for attachment of the former to the top of the frame of the latter;

Fig. 3 is a diagram indicating the vision-preserver C, R at left facing bright lamps FL at right which (when on an approaching vehicle) are moving leftward, the diagram showing direct rays DR from such offending head-lamps FL as passing leftward toward the eye of the driver at extreme left and in rear of the vision-preserver C, R; some of such direct rays DR from loops FL which pass at an angle to the eye, being incident on the mirror or reflector R of the vision-preserver and passing by reflection down thru color-screen or receiver C which may be of ordinary colored glass (as green or red, etc.) whence colored rays CR pass into the path of vision between the eye and FL, i. e., in this instance across (downwardly in the installation of Figs. 1-3) or transversely of the line of vision between the driver's eyes and the road ahead such as alongside an approaching car carrying the offending head-lamps FL;

Figs. 4 and 5 are views of a form of the invention where the illumination from bright lights to the right (i. e., ahead of and facing the vehicle on which the vision-preserver is mounted) and directed toward mirror or reflector R is increased by rays from an electric lamp L; Fig. 4 being a plan partly in section and Fig. 5 being a vertical longitudinal section (in the direction of the length of the car of Fig. 1) at 5—5 of Fig. 4; this form of the vision-preserver being secured to the car in such position as shown in Fig. 1 or any other figures hereof; and the light passing thru color-screen or receiver C including that received by reflector R from approaching offending head-lamps and including also the light from lamp L.

Figure 7:
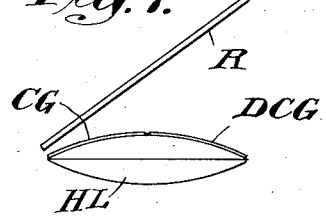
Figure 8:
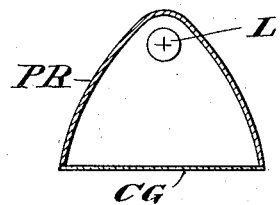
Figure 9:
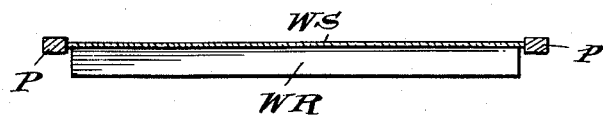

Fig. 6 is a diagrammatic illustration of another form of the vision-preserver (for mounting on the vehicle in some such location as in Fig. 1) wherein the location occupied by colored glass or receiver C in Figs. 1-2 and 4-5 is occupied by a double convex lens HL which concentrates the rays received on reflector R and passing downwardly and thru such lens thereby intensifying the illumination at points below the lens and in front of the driver across and in his line of road-vision; the rays transmitted from receiver lens HL being colored either by the employment of colored glass for the lens HL or by coloration of the reflector R or both;

Fig. 7 is a diagram of an embodiment like that of Fig. 6 save that the light transmitted by lens receiver HL consists of two colors (as red or green) one as the result of the passage of the light from reflector R down through a transparent colored strip or glass CG attached to lens HL and the other color as the result of the passage of the light from reflector R down through a second and different colored transparent strip or glass DCG attached to another portion of lens HL;

Fig. 8 is a vertical section of a form of the vision-preserver which is provided with an electric lamp L as in Figs. 4-5 but wherein the reflector R thereof is replaced by a parabolic reflector PR; in this case all the colored light (as from color-screen or receiver CG) passing across the driver's road-vision being furnished by the lamp L independently of light from sources ahead of and facing the car equipped with and protected by the invention; all the vision-preservers disclosed herein including those of Fig. 8 being mounted on the vehicle in such locations and at such angles (as in Figs. 1-3) that the colored light from them is transmitted into the line of road-vision from the cars equipped with them by reflection of rays from the offending bright lamps which pass at angles to the path of normal forward vision in Fig. 1 between the eye and the lamps FL;

Fig. 9 is a horizontal section of an ordinary wind-shield WS and its vertical side-frames P as in Fig. 1, this figure showing in plan a wide vision-preserver (of any of the forms hereof) of which the upper portion of reflector WR is seen as being so wide transversely of the car as to extend substantially entirely across the front of the part of the vehicle occupied by the passengers;

Fig. 10 is a front elevation of a motor-vehicle showing the application to the lower wind-shield-support of a form of vision-preserver shown in vertical longitudinal section in Fig. 11 (11—11 of Fig. 10) in a location in front of the lower portion of the wind-shield and the upper portion of the cowl, the reflector R projecting forwardly and downwardly (to reflect upwardly) to a greater distance than its rearward and downward extent in Fig. 1, the angle of reflector R in Figs. 10 and 11 being such as to receive some of the rays from the offending facing head-lamps FL ahead, Fig. 3, at angles to the path from FL to the eye, and the greater fore and aft superficial area of the reflector R in Figs. 10–12 causing it to receive additional rays (more than in Figs. 1–2) from the offending head-lamps ahead for additional intensity of colored light across and in front of the driver's eyes particularly when concentrating lens CGL is employed as the receiver in combination with such fore and aft wide reflector; either or both reflector R and receiver lens CGL being colored;

Fig. 12 is a view like Fig. 11 of a vision-preserver which as in Figs. 10–11 extends substantially entirely across the front of the car in advance of the dash or wind-shield but in Fig. 12 the reflector or mirror R of the preceding figures is replaced in the new combination by a special reflector in the form of the well-known luxfer prism glass LP acting as reflector but preferably of colored glass (as green, yellow or red, etc.) it being unnecessary to employ colored glass for the receiving intensifying glass lens CGL when the reflecting prism glass LP is colored.

No attempt will be made to explain the reason or reasons for the fact that the colored reflected rays CR of the diagram Fig. 3 preserve vision of the right-hand portion of the road ahead by means of the driver's own head-lights particularly alongside of approaching cars carrying bright head-lamps; nor of the fact that such vision-preservation usually is accompanied by substantial reduction of the glaring effect of the approaching lamps on the eyes of persons in the vehicle protected by the invention. The explanation of such action, may involve optics, physiology or psychology, any one or more or all, or other phenomena.

Three principal forms of the invention are illustrated by way of examples i. e., (1) where the colored reflected rays CR of Fig. 3 are initiated wholly by the offending facing lights ahead (Figs. 1–2, 6–7, 10–12); (2) where said colored reflected rays are initiated partially by the offending facing lights ahead and partly by a local or original or primary source such as electric lamp L supplied with energy from the car storage-battery (Figs. 4–5); and (3) where the colored reflected rays CR are initiated solely by such a local or original source as lamp L (Fig. 8). The preferred form is the first of the above for all cases where the operation is efficient enough without any local source such as lamp L for example, i. e., where sufficient light is received from the offending lamps as for example by a reflector (as a secondary light source) of sufficient area and optimum location on the vehicle as specified and where preferably the light so received is sufficiently intensified in front of the driver's eyes as by a receiver in the form of a concentrating lens as above. For example where no lens is employed as in Figs. 1–2 and where the vision-preserver as a whole is located as in said figures so that its substantial area in front of the driver is limited (because a further fore and aft extension of inclined reflector R would bring it down into the line of the driver's road-vision) it may be desirable in some such cases (depending on the brightness of the offending facing head-lamps and on the extent of road illumination by the driver's own head-lamps) to increase the intensity of the colored light passing into, as across, the line of road-vision as by means of lamp L of Figs. 4–5. Such lamp is not usually preferred however because after passage of an exigency of the approach of unusually bright head-lamps on another car then the presence of the lamp as or in the vision-preserver is unnecessary or is negatively useful and therefore desirably may involve the act of switching off the lamp L by the driver. But where such local or primary light-source L is employed as in Fig. 8 in place of a reflector (as R) as a light source locally in the car then the lamp preferably is of high intensity exclusive of any rays from any offending facing lamps ahead and the local lamp L may be switched at SW by the driver into the circuit of the car-battery upon the approach of unusually bright head-lamps and may be turned off after their passage from the driver's vision.

In all the forms of reflector R or LP shown it is disposed at such an angle on the vehicle that, while it is located out of the direct line of forward vision from the vehicle, yet it (1) receives light from lamps ahead of and facing the vehicle and (2) transmits such received light in a direction into, as across, the line of road-vision from the vehicle; i. e., any such reflector is inclined longitudinally of the vehicle to receive light from lamps ahead and facing it, and such angle of inclination is such that such received light is not only colored but reflected in a direction into, as across, said line of road-vision.

The forms of vision-preserver of Figs. 10–12 where the inclined reflectors R or LP (and preferably receiver CGL when employed) are located in advance of the wind-shield and above the cowl and extend a considerable distance forward in the line of the driver's vision of the engine-hood, are preferred forms because, (1) the much greater area of the inclined reflector exposed to the bright lamps facing the vehicle (caused by the greater longitudinal extension than in Figs. 1–2) causes reception of more rays from said facing lamps and (2) such location below the line of the driver's road-vision is more nearly at the level of the offending approaching head-lamps themselves (which are only about three feet above the road) thereby causing more incident rays from such head-lamps on the reflector R regardless of its area; so that thereby the efficiency of vision-preservation with or without the intensifying lenses or lamps as above is increased by such lower location and increased fore and aft extension. But the most desirable effect is when as shown in Figs. 11 and 12 a concentrating lens (Figs. 6–7) is employed in combination with a reflector (R or LP) located well down toward the horizontal level of the head-lamps of an approaching vehicle and extending a substantial distance fore and aft all so that the reflector receives maximum rays from the approaching lamps and such maximum rays are further intensified by the concentrating lens.

In any case, as in Figs. 9–12, it is useful to extend the vision-preserver laterally across the front of the passenger or passengers at the driver's right who there is in a better position than the driver to observe the right of the road ahead and therefore is a useful person to have his road-vision preserved.

In Figs. 1-2 the vision-preserver is shown as secured to the upper horizontal frame-member WSF of the wind-shield WS, this location being the highest available point of support inside the car in front of the driver and farthest above his line of road-vision. While the preserver therefore is above the line of the driver's road-vision yet the mounting is shown as pivotal at 0 in order to permit the driver to swing up the preserver when not needed as in the day-time or during night driving on dark roads without traffic; and in the pivotal form of Fig. 2 are shown stops T, T1, T2 which fix the extremes of pivotal movement; the device being held stationary by wing-nuts WN. Of course in Figs. 1-2 an operative portion of the preserver necessarily is in line with the glass of the wind-shield in order that it may receive light from lamps ahead of and facing the car, for use in reception by and reflection from reflector R.

In Figs. 1-3 the vision-preserver is shown in operative position such that the colored glass receiver or color-screen CG is about level with the driver's eyes, i. e., so that as is preferred this member CG is not a barrier to his view of the road ahead. Also the reflector R has an opaque back F acting as shield to the driver's eyes from received light; said backing F when of structural metal as shown serving to hold members R and CG in cooperative relations with one another in their two end frames E, E1 shown in Fig. 1; the part U shown in Fig. 2 being a cushion as of soft rubber to prevent breaking stresses on reflector R or color-screen receiver CG when they are of glass or other fragile material.

Suitable features of structure are shown in Figs. 1-2 for the cooperative mounting of reflector R and color-screen receiver CG and any of all these features may be employed in connection with the forms of the invention shown in the other figures.

The angle between the reflector R and the substantially horizontal color-screen receiver CG of Figs. 1-2 (or the concentrating lenses of Figs. 6-7 and 10-12) is about 45 degrees; hence reflector R is inclined to the road at about the same angle and in position to receive substantial amounts of light from approaching offending head-lamps at angles to the path of forward vision; said angle of the reflector being suitable to cause such incident light-rays to be reflected to from the reflector and thru the color-screen CG (see arrows, Figs. 2-5) in a direction into, as across, the line of road-vision from the driver's eyes. The same applies to the other forms including those where a suitable concentrating lens or receiver replaces color-screen CG as in Figs. 6-7 and 10-12.

In Fig. 4, D indicates the electric circuit conductors leading from lamp L to the car-battery not shown; switch SW may be secured in any convenient location as on the steering-wheel of the car; and similarly as to circuit-conductors and switch of the form of Fig. 8 wherein an electric lamp L is employed.

In any case the reflector R (or special reflector LP in Fig. 12) may be of colored material and in such case no other element is needed for the vision-preserver save the means for mounting it on the car in proper relation to the car and to bright lights ahead as above specified; and save that in the preferred forms a suitable concentrating lens as receiver is combined with the reflector as in the arrangements above.

The colored reflected rays CR of the diagram Fig. 3 may be initiated (i. e., received at and reflected) from any location on the car outside the driver's line of road-vision i. e., wherein reflector R is not a barrier to normal forward vision from the car. Figs. 1-2 show their place of reflection above that line, Figs. 10-12 below it; and no location at left or right of the driver's line of road-vision is indicated because there the construction of the vehicle is not such as to be adapted to the presence and attachment of the vision-preserver on the car. However, the vision-preserver may be mounted in Fig. 1 on the bottom cross-frame of the wind-shield WS, being then inverted as in the showing of Figs. 10-12 so that the reflector receiving the angle rays from FL in such case reflects them upwardly into the path of vision, Fig. 3; the reflector in such case extending rearwardly from the wind-shield-frame and upwardly toward and in front of the steering-wheel of Fig. 1. Of course, in any case when the vision-preserver is located inside the vehicle (in rear of the wind-shield as in Fig. 1) its reflector receives incident rays through the wind-shield from facing lamps ahead, whether the preserver be stationed at locations above or below the line of the driver's line of vision of the road ahead, and regardless of the angle of the wind-shield.

The vision-preserver is located on the vehicle in position so that the driver's eyes can receive colored light from it, i. e., as shown in Fig. 3 for example, the vision preserver desirably is located on the car in such position relative to the driver's eyes that the source of the colored light such as color-screen C is exposed to the driver's eyes notwithstanding that the direct rays CR from reflector R thru C are directed into, as across, his line of road-vision and notwithstanding that screen C is not interposed in his line of road-vision.

Lamp L itself may have its enclosing glass colored in which case color-screen CG may be omitted unless it be in lens form for concentrating and intensifying as above. In Figs. 5 and 8 the part CG may be such a lens as in Figs. 6, 7, 11 or 12. In any case of employment of a colored lamp as L located on the vehicle outside of the driver's line of road-vision (even altho within his sight) and causing passage of colored rays across said line of vision, then the rays from the lamp L may be aided by light from offending lights ahead facing the car as in Figs. 4-5 or not as in Fig. 8. It is permissible to employ a colored electric lamp L alone as the vision-preserver without any other optical elements provided that such lamp is mounted on the vehicle out of line of the driver's road-vision and causes passage of colored rays into, as across, such line of vision, altho such lamp preferably is within the driver's sight; although in any case a suitable lens as above described is useful in concentrating the colored rays where they enter the driver's line of road vision and thereby intensify the colored light directed into, as across, said line. But when a primary local light-source such as lamp L of high intensity is employed it preferably is shielded from points ahead of the vehicle (such as approaching cars) as by the opaque exterior of reflector PR, Fig. 8 or the metal part L1 of the metal frame F shown in Fig. 5 as extending downward in front of lamp L.

In general it is preferable in all cases to provide as or with the receiver some such lens as above for the purpose of concentrating and intensifying the colored light in an intense field in the line of the driver's road-vision, in connection with a suitable reflector receiving rays, at angles to forward vision from the vehicle, from bright facing lights ahead and reflecting them to the lens rather than to provide a local source of light such as a lamp L aided (Figs. 4–5) or not aided (Fig. 8) by light from approaching head-lamps. The concentrated rays from the lenses constitute a stronger or more intense light across and in the driver's line of road-vision with corresponding greater efficiency of the useful vision-preservation hereof; and it may be that such efficiency is due to colored illumination of dust motes in the air.

In Fig. 7 the colored transparent receiver sheet or sheets CG or DCG may be located as shown, or between the two parts of the double convex lens HL receiver or below the lower half of the latter.

In Fig. 8 if the horizontal section of the parabolic reflector PR be a circle then the rays reflected across the driver's line of road-vision will be in the form of a cylinder; but the parabola may extend entirely across the car as in Fig. 9, either in front or in rear of the wind-shield WS or above or below the wind-shield as above described for the other forms of the vision-preserver hereof.

The double convex lens HL of Figs. 6–7 as receiver is constructed with its upper focus on reflector R and its lower focus at such distance below the lens itself that the maximum concentration or intensity of the rays reflected from R, i. e. the greatest intensity of illumination by such rays passing across the driver's line of road-vision, will be between the driver's eyes and the right hand part of the road just ahead of his car and alongside an approaching car carrying bright head lights, i. e. the greatest intensity of the colored reflected rays will be between the driver's eyes and the "dark spot" which exists to the most dangerous degree in the lack of the present invention. The same are the facts as to the cylindrical lenses CGL of Figs. 11 and 12 save that in said figures the colored rays are directed upwardly from the reflector R or LP into, as across, the driver's line of road-vision instead of downwardly as in Figs. 1–8; but the lenses of Figs. 10–12 may replace those of Figs. 6–7 and vice versa; i. e. the colored reflected rays CR of Fig. 3 may be directed into, as across, the driver's line of road-vision from either above or below, left or right and along any angle from any such location provided that there is sufficient concentration of colored reflected rays between the driver's eyes and the "dark spot" of the road to increase the light-intensity to the desired extent.

For the colored rays the shortest wave-lengths (red, orange, yellow and green) seem most useful, although blue is also useful. Indigo and violet have not been tried as yet.

In Fig. 12 the lower portion of the metal frame F supporting the special reflector LP is secured at SM to the cowl between the dash and the rear of the hinged engine-hood. This frame holds lens CGL (and dirt protecting glass PG when used) in cooperative relations with reflector R as shown in addition to holding R to PG and CGL. The protecting plain glass PG when used as preferred to keep reflector LP clean may consist of "sunlight" or so-called hospital glass for efficient passage of light.

All parts of the vision-preservers of Figs. 10–12 are located below the driver's line of road-vision and in his line of vision of the engine-hood EC, so that no obstacle is interposed in the driver's line of vision of the road which line extends forwardly above the engine-hood EC.

In Fig. 12 the luxfer prism glass reflector LP may be of colored glass and in such case (whether or not the lens CGL be made of colored glass) such special reflector LP has the special advantage that all the light received by it from the right in Fig. 12 (from facing lights ahead) and reflected by reflector LP upwardly, is colored, more colored light being reflected from a given sized reflector of this type (colored LP) than from other types of reflector because no light is reflected by the special reflector LP which is not colored in accord with the color of the glass of LP. Another accompanying advantage of the employment in the present invention of the luxfer prism glass LP (whether or not the glass thereof be colored glass) is that no opaque backing is needed for such reflector, the reason for this being that the light rays coming to reflector LP from the right in Fig. 12 and incident upon it do not pass entirely through such reflector from front to rear but such incident rays after entering fully into the interior of the glass of LP from one face of each prism thereupon leave the glass by way of the other face of the prism at right angles to the entering prism face. None of the rays of white light incident upon LP is reflected by the latter as white light when LP is colored but all such rays are reflected as colored rays on account of the above action of reflection from the prisms.

In Figs. 11–12 the optical element or elements of the vision preserver (i. e., the reflector and/or the lens) are held in a frame F and such frame is secured at SM to the cowl of the vehicle so that the reflector may extend forward from a point close to the wind-shield to the forward edge of the cowl, i. e., almost to the hinged engine-cover EC.

When a receiver is employed to receive the light from reflector R (or LP, Fig. 12) as usually is preferred the receiver may be in any form such for example as those disclosed at CG in Figs. 2 and 8, C in Fig. 5, HL in Fig. 6, CG, DCG and HL in Fig. 7 or CGL in Figs. 11 and 12; but usually the receiver, when used, preferably consists of or includes a concentrating and intensifying lens such for example as HL of Figs. 6–7 or CG or DCG of Fig. 7 or CGL of Figs. 11 and 12.

I claim:

1. A motor-vehicle night-time vision-preserver including a light-reflector, a light-receiver and a vision-shield all three mounted on the vehicle out of the line of road-vision therefrom; the reflector being inclined longitudinally of the vehicle in position receiving light from lamps ahead of and facing the vehicle and reflecting such light; the light-receiver being in position at an angle to the reflector receiving light therefrom and transmitting said light to a space in said line of road-vision; at least one of the reflectors and receiver including colored material causing the light transmitted by the receiver to be colored; and said vision-shield being interposed in position between the reflector and the eyes of a person in the vehicle.

2. A motor-vehicle night-time vision-preserver which includes a light-reflector receiving light from the road ahead of the vehicle and reflecting received light into the path of vision from the inside of the vehicle of the road ahead, in combination with a color-screen interposed between said reflector and said path of road-vision, transmitting said received and reflected light, as colored light, into said path of vision; and reflector and color-screen being located operatively outside said path of vision of the road ahead.

3. A motor-vehicle night-time vision-preserver which includes a light-reflector facing the road ahead of the vehicle and reflecting received light into the path of vision from inside the vehicle of the road ahead; and light-concentrating means interposed between said reflector and said path of vision; one of said elements being colored and both of them being located operatively outside said path of vision of the road ahead.

4. A motor-vehicle night-time vision-preserver mounted on the vehicle out of the line of road-vision therefrom and including a reflector and a lens the reflector being in position inclined to the horizontal receiving light from offending lamps ahead facing the vehicle and directing it across said line of vision, the lens being in a position receiving light from the reflector and concentrating it in increased intensity across and in said line of road-vision from the vehicle; one of said elements being colored causing said reflected and concentrated light to be colored.

5. A night-time vision-preserver which includes a light-reflector and a colored receiver of light therefrom, both located operatively outside the path of vision of an observer which may include bright lamps, the reflector facing in the same general direction as the eyes of the observer in said path of vision but also facing said path diverting light received from bright lamps thereto; and said colored receiver being a light-screen located between said reflector and said path of vision, receiving the reflected light and transmitting it as colored light into said path of vision.

6. A night-time vision-preserver which includes a light-reflector of luxfer prism glass and an intensifying lens, both located operatively outside the path of desired vision of an observer which may include bright lamps, the luxfer reflector facing in the same general direction as the eyes of the observer in said path of vision but also facing said path diverting received light thereto; said intensifying lens being located between the luxfer reflector and said path of vision receiving diverted light from the former and transmitting it toward said path in an intensified field; and one of said elements being colored causing coloration of the diverted light in said path of vision.

7. A night-time vision-preserver comprising means receiving light from bright lamps which may be located in a path of vision, and transmitting such light into said path in the form of colored light therein, said means including a luxfer prism facing such lamps but outside of and facing said path.

8. A motor-vehicle night-time vision-preserver comprising two sources of colored light both located outside of said path but transmitting colored light to the path of road-vision from inside the vehicle; one consisting of an original source; and the other being in position receiving light from the road ahead and diverting it as colored light into said path of road-vision.

9. A motor-vehicle night-time vision-preserver which includes means mounted on the vehicle in position out of the line of road-vision therefrom and in position receiving light from lamps ahead of and facing the vehicle, and in position directing said received light across said line of road-vision from the vehicle; said preserver being characterized by a structure converting into colored light the light received by it.

10. A motor-vehicle night-time vision-preserver mounted on the vehicle out of the line of road-vision therefrom and including a colored reflector in position inclined to the horizontal longitudinally of the vehicle receiving light from lamps ahead of and facing the vehicle and reflecting a portion of such received light across such line of road-vision in the form of colored light.

11. A motor-vehicle night-time vision-preserver including a reflector mounted on the vehicle out of the line of road-vision therefrom and in position inclined to the horizontal longitudinally of the vehicle receiving light from lamps ahead of and facing the vehicle and in position directing as colored light across said line of road-vision a portion of said received light, in combination with means converting into the colored light the light received by said reflector.

12. In apparatus for reducing the glare from a headlight, the combination of a transparent windshield disposed in the path of the rays from the light, means including a colored screen and a reflector for receiving rays from the headlight and for casting colored rays onto the windshield, and a source of light located adjacent the windshield, with means for casting colored rays from the same onto the windshield.

13. In apparatus for use on an automobile to reduce the glare from an approaching headlight, the combination of a reflector above the line of vision of the driver for reflecting rays from the headlight onto the windshield of the automobile, and a colored translucent plate in the path of the rays to cast colored rays onto the windshield.

14. A motor-vehicle night-time vision-preserver including a light-reflector, a light-receiver and a vision-shield all three adapted to be mounted on the vehicle out of the line of road-vision therefrom; the reflector being inclined longitudinally of the vehicle in position receiving light from lamps ahead of and facing the vehicle and reflecting such light; the light-receiver being adapted to be in position at an angle to the reflector receiving light therefrom and transmitting said light to a space in said line of road-vision and to the windshield; at least one of the reflectors and receiver including colored material causing the light transmitted by the receiver to be colored; and said vision-shield being adapted to be interposed in position between the reflector and the eyes of a person in the vehicle.

15. A motor-vehicle night-time vision-preserver adapted to be mounted on the vehicle out of the line of road-vision therefrom and including an inclined reflector in position receiving light from lamps ahead of and facing the vehicle and in position reflecting the received light in a direction across said line of road-vision from the vehicle; in combination with a color-screen receiving light from said reflector and passing it as colored light in said direction across said line of road-vision from the vehicle and to the windshield thereof.

16. A motor-vehicle night-time vision-preserver adapted to be mounted on the vehicle out of the line of road-vision therefrom and including an inclined reflector in position receiving light from lamps ahead of and facing the vehicle and reflecting said light in a direction across said line of road-vision from the vehicle; in combination with a light-concentrating color-screen receiving light from said reflector and concentrating it as intensified colored light across and in said line of road-vision from the vehicle and to the windshield thereof.

17. A motor-vehicle night-time vision-preserver adapted to be mounted on the vehicle out of the line of road-vision therefrom and including a reflector in position inclined to the horizontal receiving light from offending lamps ahead of and facing the vehicle and in position reflecting said light in a direction across said line of road-vision from the vehicle; in combination with a colored lens in position receiving light from said reflector and concentrating it as intense colored light across and in said line of road-vision from the vehicle, and to the windshield thereof.

18. A motor-vehicle night-time vision-preserver adapted to be mounted on the vehicle out of the line of road-vision therefrom and including a reflector and a lens the reflector being in position inclined to the horizontal receiving light from offending lamps ahead facing the vehicle and directing it across said line of vision, the lens being in a position receiving light from the reflector and concentrating it in increased intensity across and in said line of road-vision from the vehicle, and to the windshield thereof; one of said elements being colored causing said reflected and concentrated light to be colored.

19. A motor-vehicle night-time vision-preserver adapted to be mounted on the vehicle out of the line of road-vision therefrom and including a light-reflector and a light-receiver, the reflector being inclined longitudinally of the vehicle in position receiving light from offending lamps facing the vehicle and directing it across said line of vision, the light-receiver being in position at an angle to the reflector receiving light therefrom and transmitting such light in said direction across said line of road-vision from the vehicle and to the windshield thereof, at least one of said elements consisting of material causing the reflected light to be colored.

20. A night-time vision-preserver for a motor-vehicle which includes a light-reflector and a colored light-receiver said elements being combined at an angle with one another and adapted to be mounted on the vehicle in positions wherein the reflector receives light from lamps ahead of and facing the vehicle and reflects it to and thru the receiver in a direction across the line of road-vision from the vehicle and to the windshield thereof.

21. A motor-vehicle night-time vision-preserver which includes luxfer prism glass and an intensifying lens adapted to be both mounted on the vehicle out of the line of road-vision therefrom said luxfer prism glass being inclined longitudinally of the vehicle in position receiving light from offending lamps ahead of and facing the vehicle and directing the same across said line of road-vision to and thru said lens; said lens being mounted in position receiving the light reflected by said luxfer prism glass transmitting it in said transverse direction and concentrating it in a field of greater intensity in said line of road-vision, and to the windshield of the motor-vehicle; one of said elements being of colored material causing coloration of said crosslight in said line of vision.

22. A motor-vehicle night-time vision-preserver which includes a luxfer prism glass mounted on the vehicle out of the line of road-vision therefrom said prism glass being adapted to be mounted on the vehicle inclined longitudinally of the vehicle in position receiving light from head-lamps ahead of and facing the vehicle and in position directing such received light across said line of road-vision and to the windshield of the motor-vehicle in the form of colored light, in combination with means converting into the colored light, the light received by the luxfer prism.

23. A motor-vehicle night-time vision-preserver which includes a light-reflector adapted to be mounted on the vehicle out of the line of road-vision therefrom said reflector being inclined to the horizontal longitudinally of the vehicle in position receiving light from lamps ahead of and facing the vehicle and in position directing such received light across said line of road-vision and to the windshield of the motor-vehicle, in the form of colored light, in combination with means converting into colored light, the light received by said reflector and so directed.

24. A motor-vehicle night-time vision-preserver including two sources of light adapted to be both mounted on the vehicle out of the line of road-vision therefrom one of said sources being an original source and the other being a secondary source in the form of a reflector inclined longitudinally of the vehicle receiving light from lamps ahead of and facing the vehicle said original source being located to transmit its light also to said reflector and said reflector being in position transmitting its received light as colored light in a direction across said line of road-vision from the vehicle and to the windshield thereof.

25. A motor-vehicle night-time vision-preserver which includes means adapted to be mounted on the vehicle in position out of the line of road-vision therefrom and in position receiving light from lamps ahead of and facing the vehicle, and in position directing said received light across said line of road-vision from the vehicle and to the windshield thereof; said preserver being characterized by a structure converting into colored light the light received by it.

26. A motor-vehicle night-time vision-preserver adapted to be mounted on the vehicle out of the line of road-vision therefrom and including a colored reflector in position inclined to the horizontal longitudinally of the vehicle receiving light from lamps ahead of and facing the vehicle and reflecting a portion of such received light across such line of road-vision and to the windshield of the motor-vehicle in the form of colored light.

27. A motor-vehicle night-time vision-preserver including a reflector adapted to be mounted on the vehicle out of the line of road-vision therefrom and in position inclined to the horizontal longitudinally of the vehicle receiving light from lamps ahead of and facing the vehicle and in position directing as colored light across said line of road-vision and to the windshield of the motor-vehicle, a portion of said received light, in combination with means converting into such colored light, the light received by said reflector and so directed.

28. A motor-vehicle night-time vision-preserver including a light-reflector and a light-receiver one of them including colored material and a frame engaging and supporting their ends but exposing their facing surfaces and the outer face of the receiver; said frame being adapted to be mounted on the vehicle in position directing colored light to the windshield thereof, and constructed to retain the reflector and receiver at an angle to one another causing light-rays incident on the facing surface of the reflector from various angles generally paralleling the receiver to be directed thru the receiver by the reflector in various angles in general perpendicular to the receiver.

DEWEY HINE.